US005877229A

United States Patent [19]
Janke et al.

[11] Patent Number: 5,877,229
[45] Date of Patent: *Mar. 2, 1999

[54] HIGH ENERGY ELECTRON BEAM CURING OF EPOXY RESIN SYSTEMS INCORPORATING CATIONIC PHOTOINITIATORS

[75] Inventors: Christopher J. Janke, Powell, Tenn.; Vincent J. Lopata, Manitoba, Canada; Stephen J. Havens, Knoxville; George F. Dorsey, Farragut, both of Tenn.; Richard J. Moulton, Lafayette, Calif.

[73] Assignee: Lockheed Martin Energy Systems, Inc., Oak Ridge, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 507,569

[22] Filed: Jul. 26, 1995

[51] Int. Cl.$^6$ .............................. C08L 63/00; C08L 63/02; C08J 3/28

[52] U.S. Cl. ............................ 522/31; 522/170; 522/129; 522/146

[58] Field of Search ................................. 522/25, 31, 170, 522/129, 146

[56] References Cited

U.S. PATENT DOCUMENTS

| | | | |
|---|---|---|---|
| 3,649,337 | 3/1972 | Johnson et al. | 117/93.31 |
| 3,936,557 | 2/1976 | Watt | 428/211 |
| 4,101,513 | 7/1978 | Fox et al. | 826/193 |
| 4,154,872 | 5/1979 | Tsao et al. | 522/31 |
| 4,201,640 | 5/1980 | Watt | 522/31 |
| 4,289,595 | 9/1981 | Tortorello | 522/31 |
| 4,297,401 | 10/1981 | Chern et al. | 428/1 |
| 4,310,469 | 1/1982 | Crivello | 522/31 |
| 4,318,766 | 3/1982 | Smith | 156/330 |
| 4,394,403 | 7/1983 | Smith | 427/42 |
| 4,684,671 | 8/1987 | Tsuchiya et al. | 522/31 |
| 4,885,319 | 12/1989 | Dougherty et al. | 522/31 |
| 4,935,320 | 6/1990 | Rohde et al. | 430/14 |
| 4,977,199 | 12/1990 | Koleske et al. | 522/31 |
| 5,141,970 | 8/1992 | McArdle et al. | 522/170 |
| 5,144,051 | 9/1992 | Kessel et al. | 522/31 |
| 5,155,143 | 10/1992 | Koleske | 522/31 |
| 5,260,349 | 11/1993 | Crivello | 522/31 |
| 5,268,489 | 12/1993 | Koleske et al. | 549/215 |
| 5,302,438 | 4/1994 | Komamura et al. | 428/195 |
| 5,340,898 | 8/1994 | Cavezzan et al. | 522/64 |
| 5,350,604 | 9/1994 | Crivello | 427/512 |

FOREIGN PATENT DOCUMENTS

| | | |
|---|---|---|
| 0 082 602 A2 | 6/1983 | European Pat. Off. . |
| 0 499 542 A1 | 2/1992 | European Pat. Off. ...... C08F 267/10 |
| 6 0202-120-A | 3/1984 | Japan . |

OTHER PUBLICATIONS

T. C. Walton (Aspen Systems, Inc.) and J. V. Crivello, "Innovative Composite Fabrication Using Electron–Beam Rapidly Cured, Micrometeroid and Atomic Oxygen Resistant EFS Polymers," *39th International SAMPE Symposium,* Apr. 11–14, 1994, 497–513.

A. Udagawa, Y. Yamamoto, Y. Inoue, R. Chujo, T. Sasaki, and I. Ishigaki, "Plasticization and Antiplasticization Effects of Sulfonium Salt Initiator Fragments Remaining in Cycloaliphatic Epoxy Resins Cured by Electron Beam and Ultraviolet Radiation," *Polymer,* 33(2), 1992, 264–267.

Okada et al, "Electron Beam Curing at Bispherol A Epoxy Resins", Kibunshi Ronbunshy 44(10),pp. 761–770, 1987. Translation.

M. Hatzakis, K. J. Stewart, J. M. Shaw, and S. A. Rishton (IBM), "New High–Resolution and High–Sensitivity Deep UV, Xray, and Electron–Beam Resists," *J. Electrochem. Soc.,* 138(4), 1991, 1076–1079.

K. J. Stewart, M. Hatzakis, J. M. Shaw, and D. E. Seeger (IBM), "Simple negative resist for deep ultraviolet, electron beam, and x–ray lithography," *J. Vac. Sci. Technol. B.,* 7(6), 1989, 1734–1739.

M. Hatzakis, K. J. Stewart, J. M. Shaw, and S. A. Rishton (IBM), "New, High Resolution and High Sensitivity Deep UV, Xray, and Electron Beam Resists," *Microelectronic Engineering,* 11, 1990, 1487–490.

Per–Erik Sundell, Sonny Jonsson, and Anders Hult, "High–Energy–Radiation–Induced cationic Polymerization of Vinyl Ethers in the Presence of Onium Salt Initiators," in Radiation Curing of Polymeric Materials, Charles E. Hoyle and James F. Kinstle, Editors, ACS Symposium Series 417 (1990).

Anders Hult, Sonny Jonsson, Eva Malmstrom, Per–Erik Sundell, "EB and γ Induced Acid Formation by Onium Salts in Organic Liquids," *Aspects of Photoinitiation,* Ink and Radcure Services, PRA, Egham, England, Oct. 19–20, 1993, 50–64.

K. Dietliker, "Chemistry & Technology of UV & EB Formulation for Coatings, Inks & Paints," *vol. III Photoinitiators for Free Radical and Cationic Polymerization,* 1991, SITA Technology Ltd., London.

M. Braithwaite, R. S. Davidson, R. Holman, C. Lowe, P.K.T. Oldring, M. S. Salim, C. Wall, "Chemistry & Technology of UV & EB Formulation for Coatings, Inks & Paints," *vol. IV, Formulation,* ed. P.T.K. Oldring, 1991, SITA Technology Ltd., London.

Heiner Bayer and Bernhard Stapp (Siemens AG), "Photo– and Thermoinitiated Curing of Epoxy Resins by Sulfonium Salts," *RadTech Europe May 2 to 6, 1993 Mediterraneo,* 451–463.

(List continued on next page.)

*Primary Examiner*—Susan W. Berman
*Attorney, Agent, or Firm*—Ivan L. Ericson

[57] ABSTRACT

A mixture of epoxy resins such as a semi-solid triglycidyl ether of tris (hydroxyphenyl) methane and a low viscosity bisphenol A glycidyl ether and a cationic photoinitiator such as a diaryliodonium salt is cured by irradiating with a dosage of electron beams from about 50 to about 150 kGy, forming a cross-linked epoxy resin polymer.

24 Claims, No Drawings

OTHER PUBLICATIONS

Antoine Carroy (Union Carbide Chemicals and Plastics), "Comparison of Reactive Diluents in Cationic UV–Curable Formulations," *RadTech Europe May 2 to 6, 1993 Mediterraneo*, 489–500.

AECL Accelerators, "The I–10/1 Industrial Electron Accelerator," Nov. 1991.

AECL Accelerators, "The High Energy, High Power Choice in Industrial Accelerators IMPELA," Oct. 1993.

James V. Crivello, Mingxin Fan, and Daoshen Bi, "The Electron Beam–Induced Cationic Polymerization of Epoxy Resins," *Journal of Applied Polymer Science*, vol. 44, 9–16 (1992).

R. Stephen Davidson and Susan A. Wilkinson, "Electron–beam–induced polymerization of epoxides," *J. Photochem. Photobiol. A: Chem.*, 58 (1991) 123–134.

J. V. Crivello, "Cationic Polymerization–Iodonium and Sulfonium Salt Photoinitiators,", *Advances in Polymer Science* 62, Springer–Verlag Berlin Heidelberg 1984, pp. 1–42.

N. Glezos, I. Raptis, D. Tsoukalas, and M. Hatzakis, "Application of a new analytical technique of electron distribution calculations to the profile simulation of a high sensitivity negative electron–beam resist," *J. Vac. Sci. Technol.*, B10(6), Nov./Dec. 1992, 2606–2609.

Richard J. Batten, R. Stephen Davidson, and Susan A. Wilkinson, "Radiation curing of an epoxy–acrytate–6,7–epoxy–3.7–dimethylactyl acrylate," *J. Photochem. Photobiol. A:Chem*, 58 (1991), 115–122.

P Dufour, Alice Pincus, T Tanihata, G G Skelhorne and R E Knight, "Chemistry & Technology of UV & EB Formulation for Coatings, Inks & Paints," SITA Technology, pp. 15–17, 107–116, (1991).

J. P. Fouassier, J. F. Rabek, "Radiation Curing in Polymer Science and Technology—vol. 1, Fundamentals and Methods," Elsevier Science Publishers Ltd (England), pp. 5–9, 123–133, 193–196, 226–228, 343–346, 503–505 (1993).

HIGH ENERGY ELECTRON BEAM CURING OF EPOXY RESIN SYSTEMS INCORPORATING CATIONIC PHOTOINITIATORS

This invention was made with Government support under contract DE-AC05-84OR21400 awarded by the U.S. Department of Energy to Lockheed Martin Energy Systems, Inc. and the Government has certain rights in this Invention.

FIELD OF THE INVENTION

The present invention relates to a method of curing epoxy resins, more particularly, to a method of curing epoxy resin systems containing cationic photoinitiators.

BACKGROUND OF THE INVENTION

For the most part the polymerization or curing of monomers to high molecular weight or highly crosslinked polymers by means of high energy electron beam radiation has been limited to a few general types of monomers. Monomers and oligomers containing acrylate and methacrylate groups have been extensively used as electron beam curable coatings and adhesives. Monomers and oligomers containing carbon-carbon double bonds, such as vinyls, allenes, and dienes, are also known to be electron beam curable. These monomers and oligomers react by means of free radical mechanisms and under high energy ionizing radiation such as electron beam require no free radical initiators. However, these resins tend to be toxic and expensive. Of greater concern is the fact that the polymers produced by crosslinking these materials are of limited value for many applications. Such drawbacks include low glass transition temperature (or low service temperature), low mechanical properties such as strength and modulus, and high shrinkage when cured.

What is desired is a means by which higher performance resins can be processed at any temperature, cured by means of electron beam radiation, and still achieve the same thermal and mechanical properties as when thermally cured. A recent patent by Aerospatiale (Eur. Pat. Appl EP 499,542) described a process by which bismaleimides can be cured at ambient temperature by electron beam radiation to yield materials with good mechanical properties and glass transition temperatures in excess of 300° C. Coreactive diluents were added to the bismaleimides to make them processable at lower temperatures.

Epoxy resins are much more widely used than bismaleimides although their thermal properties are not quite as high. Epoxies are produced in hundreds of millions of pounds annually and are widely used in a variety of applications (L. V. McAdams and J. A. Gannon, "Epoxy Resins", *Encyclopedia of Polymer Science and Technology*, John Wiley & Sons). A method of curing epoxy resins by means of electron beam radiation would therefore be of considerable value. Visible-ultraviolet curing of thin films of cycloaliphatic epoxies using a cationic photoinitiator is well known (J. V. Crivello, *Advances in Polymer Science*, Vol. 61, p. 1, 1984).

However, these processes are limited to thin coatings due to the low penetration of visible-ultraviolet radiation. Thermal and mechanical properties of these materials are low and curing is incomplete. There has been little reported success with the electron beam curing of epoxies. Crivello (J. V. Crivello, M. Fan, and D. Bi:, *Journal of Applied Polymer Science*, Vol. 44, p.9, 1992; U.S. Pat. No. 5,260, 349) has recently disclosed a series of highly reactive cycloaliphatic silicone epoxies which are electron beam curable in the presence of certain cationic photoinitiators (diaryliodonium and triarylsulfonium salts). Crivello further reported that cycloaliphatic epoxies and conventional bisphenol A based epoxies cured poorly under the same conditions. Massive doses of electron beam radiation were required. Others (R. S Davidson and S. A. Wilkinson, *Journal of Photochemistry and Photobioiogy A:Chemistry*, Vol. 58, p.123, 1991) have also reported that examples of these same types of photoinitiators do not lead to complete electron beam curing of certain cycloaliphatic epoxies. It would appear that in some cases cationic photoinitiators react upon exposure to high energy electron beam radiation to produce cationic species which are capable of propagating cationic polymerization. However, degree of curing varies considerably.

OBJECTS OF THE INVENTION

Accordingly, it is an object of the present invention to provide a method of curing epoxy resin systems containing cationic photoinitiators. Further and other objects of the present invention will become apparent from the description contained herein.

SUMMARY OF THE INVENTION

In accordance with one aspect of the present invention, a new and improved method of curing an epoxy resin system comprises the following steps:

Step 1. Provide a blend of an epoxy resin system. The epoxy resin system comprises an epoxy resin and a cationic photoinitiator. The epoxy resin is selected from the group consisting of: glycidyl ethers of bisphenol A, epoxy phenolic novolacs, epoxy cresol novolacs, bisphenol F epoxies, tetraglycidyl ether of tetrakis (4-hydroxyphenyl) ethane, diglycidyl ether of 9,9-bis (4-hydroxyphenyl) fluorene, glycidyl ether of the condensation product of dicyclopentadiene and phenol, triglycidyl ether of tris (hydroxyphenyl) methane, 3',4'-epoxycyclohexylmethyl 3,4-epoxycyclohexanecarboxylate, diglycidylester of hexahydrophthalic anhydride, bis (3,4-epoxycyclohexylmethyl) adipate, isomeric mixture of bis (2,3-epoxycyclopentyl) ether, isomeric mixture of bis (2,3-epoxycyclopentyl) ether reacted with ethylene glycol, isomeric mixture of bis (2,3-epoxycyclopentyl) ether blended with a bisphenol A based glycidyl ether, and mixtures thereof. The cationic photoinitiator is selected from the group consisting of: diaryliodonium salts, triarylsulfonium salts, and mixtures thereof. The diaryliodonium salts have the following formula:

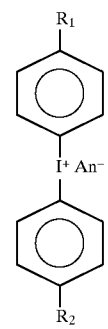

where $R_1$ and $R_2$ are selected from the group consisting of: H, methyl, ethyl, n-propyl, isopropyl, n-butyl, tert-butyl, Cl, Br, $OC_nH_{2n+1}$, $OCH_2CH(CH_3)C_nH_{2n+1}$, $OCH_2CH(C_2H_5)C_nH_{2n+1}$, $OCH_2CH(OH)C_nH_{2n+1}$, $OCH_2CO_2C_nH_{2n+1}$, OCH $(CH_3)CO_2C_nH_{2n+1}$, $OCH(C_2H_5)CO_2C_nH_{2n+1}$, and mixtures thereof where n is an integer between 0 and 18.

An⁻ is an anion selected from the group consisting of: hexafluoroarsenate ($AsF_6^-$), hexafluoroantimonate ($SbF_6^-$), hexafluorophosphate ($PF_6^-$), boron tetrafluoride ($BF_4^-$), trifluoromethane sulfonate ($CF_3SO_3^-$), and tetrakis (pentafluorophenylborate) ($B[C_6F_5]_4^-$), and mixtures thereof.

The triarylsulfonium salts have the following formulas:

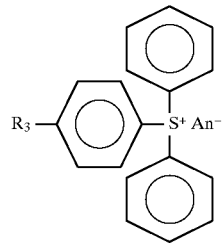

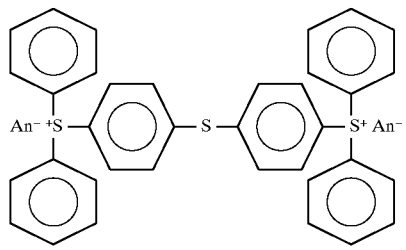

where $R_3$ is selected from the group consisting of: H, methyl, ethyl, n-propyl, isopropyl, n-butyl, tert-butyl, phenylsulfide (PhS), phenoxy (PhO), and mixtures thereof.

An⁻ is an anion selected from the group consisting of:

hexafluoroarsenate ($AsF_6^-$), hexafluoroantimonate ($SbF_6^-$), hexafluorophosphate ($PF_6^-$), boron tetrafluoride ($BF_4^-$), trifluoromethane sulfonate ($CF_3SO_3^-$), and tetrakis (pentafluorophenylborate) ($[C_6F_5]_4^-$), and mixtures thereof.

Step 2. Irradiate the blend with ionizing radiation to form a cross-linked epoxy resin polymer.

In accordance with another aspect of the present invention, a new and improved method of curing an epoxy resin system comprises the following steps:

Step 1. Provide a blend of an epoxy resin system. The epoxy resin system comprises epoxy resins and a cationic photoinitiator. The epoxy resins are a blend of a semi-solid epoxy, triglycidyl ether of tris (hydroxyphenyl) methane, and a low viscosity epoxy, glycidyl ether of bisphenol A. The cationic photoinitiator is (4-octyloxyphenyl) phenyliodonium hexafluoroantimonate.

Step 2. Irradiate the blend of an epoxy resin system with ionizing radiation to form a crosslinked epoxy resin polymer.

In accordance with another aspect of the present invention, a new and improved method of curing an epoxy resin system comprises the following steps:

Step 1. Provide a blend of an epoxy resin system. The epoxy resin system comprises epoxy resins and a cationic photoinitiator. The epoxy resins are a blend of a glycidyl ether of the condensation product of dicyclopentadiene and phenol, and a low viscosity epoxy, glycidyl ether of bisphenol A. The cationic photoinitiator is (4-octyloxyphenyl) phenyliodonium hexafluoroantimonate.

Step 2. Irradiate the blend of an epoxy resin system with ionizing radiation to form a crosslinked epoxy resin polymer.

In accordance with another aspect of the present invention, a new and improved epoxy resin system comprises a blend of an epoxy resin and a cationic photoinitiator. The epoxy resin is selected from the group consisting of: glycidyl ethers of bisphenol A, epoxy phenolic novolacs, epoxy cresol novolacs, bisphenol F epoxies, tetraglycidyl ether of tetrakis (4-hydroxyphenyl) ethane, diglycidyl ether of 9,9-bis (4-hydroxyphenyl) fluorene, glycidyl ether of the condensation product of dicyclopentadiene and phenol, triglycidyl ether of tris (hydroxyphenyl) methane, 3',4'-epoxycyclohexylmethyl 3,4-epoxycyclohexanecarboxylate, diglycidylester of hexahydrophthalic anhydride, bis (3,4-epoxycyclohexylmethyl) adipate, isomeric mixture of bis (2,3-epoxycyclopentyl) ether, isomeric mixture of bis (2,3-epoxycyclopentyl) ether reacted with ethylene glycol, isomeric mixture of bis (2,3-epoxycyclopentyl) ether blended with a bisphenol A based glycidyl ether, and mixtures thereof. The cationic photoinitiator is selected from the group consisting of: diaryliodonium salts, triarylsulfonium salts, and mixtures thereof. The diaryliodonium salts have the following formula:

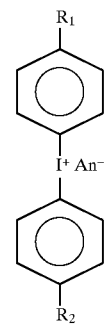

where $R_1$ and $R_2$ are selected from the group consisting of: H, methyl, ethyl, n-propyl, isopropyl, n-butyl, tert-butyl, Cl, Br, $OC_nH_{2n+1}$, $OCH_2CH(CH_3)C_nH_{2n+1}$, $OCH_2CH(C_2H_5)C_nH_{2n+1}$, $OCH_2CH(OH)C_nH_{2n+1}$, $OCH_2CO_2C_nH_{2n+1}$, $OCH(CH_3)CO_2C_nH_{2n+1}$, $OCH(C_2H_5)CO_2C_nH_{2n+1}$, and mixtures thereof where n is an integer between 0 and 18.

An⁻ is an anion selected from the goup consisting of: hexafluoroarsenate ($AsF_6^-$), hexafluoroantimonate ($SbF_6^-$), hexafluorophosphate ($PF_6^-$), boron tetrafluoride ($BF_4^-$), trifluoromethane sulfonate ($CF_3SO_3^-$), and tetrakis (pentafluorophenylborate) ($B[C_6F_5]_4^-$), and mixtures thereof.

The triarylsulfonium salts have the following formulas:

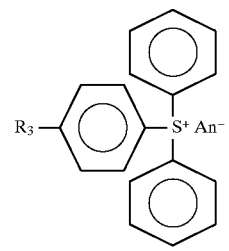

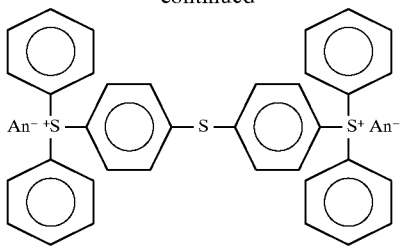

where R₃ is selected from the group consisting of: H, methyl, ethyl, n-propyl, isopropyl, n-butyl, tert-butyl, phenylsulfide (PhS), phenoxy (PhO), and mixtures thereof.

An⁻ is an anion selected from the group consisting of:

hexafluoroarsenate ($AsF_6^-$), hexafluoroantimonate ($SbF_6^-$), hexafluorophosphate ($PF_6^-$), boron tetrafluoride ($BF_4^-$), trifluoromethane sulfonate ($CF_3SO_3^-$), and tetrakis (pentafluorophenylborate) ($B[C_6F_5]_4^-$), and mixtures thereof.

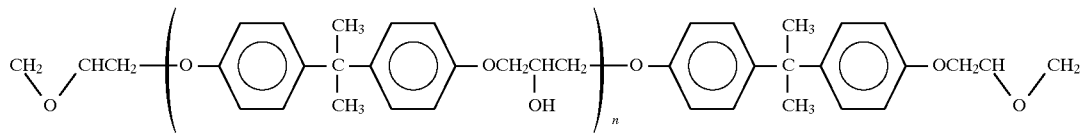

DETAILED DESCRIPTION OF THE PREFERRED EMBODIMENTS

This invention describes a method or process by which conventional epoxy resins can be cured (crosslinked) by the application of ionizing radiation. The currently used thermal processes for curing epoxies with an amine, anhydride, or other coreactive curing agent or with a catalyst require that the mixture be heated above its final glass transition temperature. For many resin mixtures this may require a complex heating cycle which may reach temperatures as high as 150°–300° C. If not completely cured the resin suffers from poor mechanical properties. The process of this invention allows the epoxy resin to be rapidly cured to a high glass transition temperature (essentially the same or higher in some cases as with thermal curing) at any temperature at or above the glass transition temperature of the epoxy monomers, while still exhibiting the same mechanical properties. Additional advantages obtained from this process are the lack of mechanical stresses, which result from thermal curing, and reduced manufacturing expenses related to faster curing times, lower energy requirements, and the elimination of expensive thermal processing equipment. This process is potentially useful in the manufacture and application of coatings, encapsulants, adhesives, and composite matrices.

Specifically, this invention relates to the radiation curing of an epoxy resin or mixtures of epoxy resins (Part A) which contains an initiator (Part B). When the initiator is subjected to ionizing radiation a cationic species (positively charged ion) is produced which initiates the cationic cure of the epoxy resin. The mechanism of the cationic curing of epoxies is well known (L. V. McAdams and J. A. Gannon, "Epoxy Resins", Encyclopedia of Polymer Science and Technology, John Wiley & Sons).

Ionizing radiation refers to high energy radiation such as x-rays, gamma rays, and electron beam (e-beam) radiation. Electron beam radiation as produced by an accelerator is particularly useful.

The epoxy resin (Part A) may be virtually any of a variety of commercially available materials. The glycidyl ethers of various phenolic compounds are particularly important. These include the glycidyl ethers of bisphenol A as given by the following formula where n ranges from 0 to 12:

These resins are widely available from a number of manufacturers such as Shell Chemical Company, DOW Chemical Company, and Ciba-Geigy Corporation in a variety of molecular weights and viscosities. Examples include: D.E.R. 332, D.E.R. 330, D.E.R. 331, D.E.R. 383, TACTIX 123, Tactix 138, and TACTIX 177 (DOW trademarks); EPON 825, EPON 826, and EPON 828 (Shell trademarks); and, ARALDITE GY 6008, ARALDITE GY 6010, and ARALDITE GY 2600 (Ciba-Geigy trademarks).

Another important class of glycidyl ethers are those of phenolic novolac and cresol novolac resins as given by the following formula where n ranges from 0 to 5:

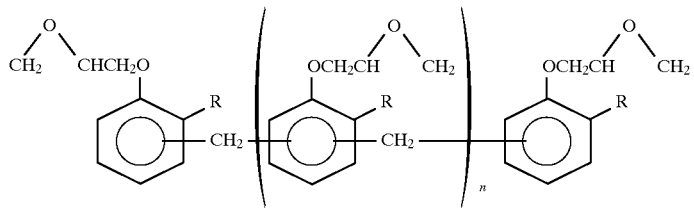

For epoxy phenolic novolacs, R=H, and for epoxy cresol novolacs, R=CH₃. For bisphenol F epoxy resins R=H and the value of n is low (0 to 0.15). These materials are also widely available from a number of manufacturers in a variety of molecular weights and viscosities. Examples include EPON 862, EPON 155 (Shell trademarks); D.E.R. 354, D.E.N. 431, D.E.N. 438, and D.E.N. 439 (DOW trademarks); and ARALDITE PY 306, ARALDITE EPN 1139, ARALDITE EPN 1138, ARALDITE GY 281, ARALDITE GY 285, ARALDITE GY 302-2, ARALDITE LY 9703, ARALDITE XD 4955, and ARALDITE ECN 9511 (Ciba-Geigy trademarks).

Several other polyfunctional glycidyl ethers are of significant importance for high performance applications i.e. heavy mechanical loads under conditions of high temperature and harsh environment. The materials include:

The tetraglycidyl ether of tetrakis (4-hydroxyphenyl) ethane, which is commercially available as EPON 1031 (Shell Chemical trademark) and ARALDITE MT 0163 (Ciba-Geigy trademark).

The diglycidyl ether of 9,9-bis (4-hydroxyphenyl) fluorene is available as EPON HPT 1079 (Shell Chemical trademark).

A glycidyl ether of the condensation product of dicyclopentadiene and phenol is available as TACTIX 556 DOW Chemical trademark) as given by the following formula where n is approximately 0.2:

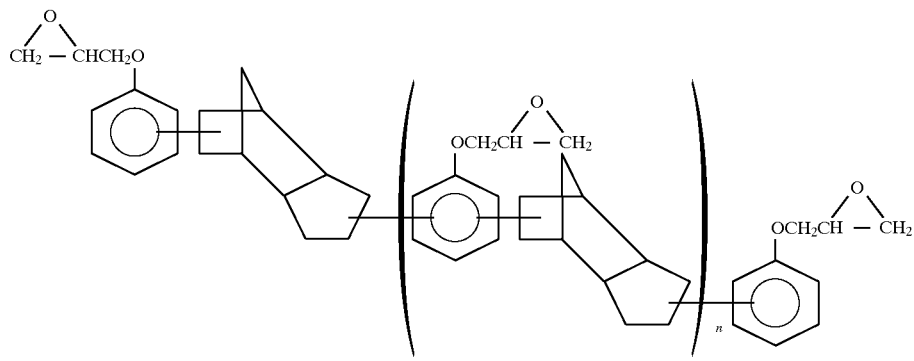

The triglycidyl ether of tris (hydroxyphenyl) methane is available as TACTIX 742 (DOW Chemical trademark).

These latter materials, EPON 1031, EPON HPT 1079, TACTIX 556, and TACTIX 742, are either high viscosity liquids or solids at room temperature. Therefore it is advantageous to blend these materials with a low viscosity bisphenol A or bisphenol F based glycidyl ether. The resulting blends are less viscous at ambient temperatures and are more easily processed. Some heating may be required for adequate flow, but not temperatures high enough to cause thermal curing of the epoxy group.

Cycloaliphatic epoxies represent another group of epoxies useful in the present invention. They are usually low viscosity liquids at room temperature and can either be used alone or as reactive diluents in blends with the semi-solid glycidyl ether epoxies. These materials include 3',4'-epoxycyclohexylmethyl 3,4-epoxycyclohexanecarboxylate, which is available as ERL-4221 (Union Carbide Corporation trademark) and ARALDITE CY 179 (Ciba-Geigy trademark); diglycidylester of hexahydrophthalic anhydride which is available as CY 184 (Ciba-Geigy trademark); bis(3,4-epoxycyclohexylmethyl) adipate, which is available as ERL-4299 (Union Carbide trademark); the isomeric mixture of bis (2,3-epoxycyclopentyl) ether, which was once available as ERL4205 (Union Carbide trademark); ERL-4205 reacted with ethylene glycol or blended with a bisphenol A based glycidyl ether, which were once available from Union Carbide as ERLB-4617 and ERL-2258 (Union Carbide trademarks), respectively.

The epoxy resin (Part A) as just described may also be advantageously modified by mixing with ten percent or less of various additives. Such additives include glycols such as ethylene glycol, propylene glycol, 1,3-butylene glycol, 1,4-butylene glycol, and other polyols. Aromatic diphenols and polyphenolic compounds may also be used to modify the epoxy resin. Other reactive diluents, which contain vinyl, acrylate, or methacrylate may be employed to increase reactivity, glass transition temperature, or mechanical properties. In addition, reactive diluents based on monofunctional or polyfunctional glycidyl ethers may also be used to reduce the viscosity or modify the resin systems.

The most useful application of this invention lies in the blending of two or more of the Part A epoxy resins in order to optimize overall resin viscosity for ease of processing. Resin blending may also be used to enhance the thermal and mechanical properties of the cured resin.

Specific blends were found to have a good overall combination of low viscosity in the uncured state and high glass transition temperature, flexural strength, and modulus when cured. It was found to be particularly advantageous to blend a high performance semi-solid epoxy such as TACTIX 556, TACTIX 742 or EPON HPT 1079 with a low viscosity bisphenol A or bisphenol F based glycidyl ether epoxy such as EPON 862. Specific examples are listed in Tables 1–3. A description of the materials are listed in Table 4. (4-Octyloxyphenyl) phenyliodonium hexafluoroantimonate (OPPI) at concentrations of one and three parts per hundred of the epoxy blend was used as the initiator although any of the initiators described as Part B could potentially be used at concentrations ranging from 0.25 to 10 parts per hundred of active initiator. Ionizing radiation was provided by an electron beam accelerator (Energy 10 MeV; Power, 1 kW). Specimens were irradiated in single or multiple passes. Total dosage received by the specimens ranged between 50 and 150 kGy, although possible curing dosages of between 10 and 500 kGy could be used. Accelerators with different energy and power levels could also be used. X-ray or gamma sources could also be used as the source of ionizing radiation.

While the cured resins exhibit good thermal and mechanical properties they tend, like most epoxies, to be somewhat brittle. It is envisioned that this short-coming will be overcome by the addition of toughening agents to the resin system (Part A plus Part B). Toughening agents such as elastomeric microspheres and thermoplastics (e.g. polyarylene ethers, polysulfones and polyimides) may be added in concentrations ranging from 2 to 40 percent of the resin system. Three different resin systems containing three different molecular weights of hydroxy-terminated polyether sulfone having molecular weights of 2650, 5360, or 8890 g/mole at 20% loading each were added to Dow's TACTIX 123 resin containing 3 phr of OPPI and electron beam cured at 150 kGy to toughen the resin system. Results indicate that all three of these resin systems approximately doubled the $K_{1c}$ values compared to the control resin system (Control—TACTIX 123 with 3 phr OPPI; cured at 150 kGy with no added toughening agent) which had a value of 352 psi.in$^{0.5}$ compared to values of 637, 665, and 672 psi.in$^{0.5}$ for the 2650, 5360, and 8890 molecular weights, respectively of the hydroxy-terminated thermoplastic material. Additionally, it is expected that the resin system may be reinforced with fibers which may include carbon, glass, aramid, polyethylene, or other reinforcement fibers to form a composite. Fillers such as clay, minerals, and other inert materials may also be added.

Uses of the process of this invention include coatings, encapsulants for electronic devices, adhesives, molded and cast parts, and laminates and composites with fiber reinforcement. Unlike the cationic curing of epoxy resins with visible or ultraviolet light, the use of a penetrating high energy electron beam to initiate the curing reaction means that thick sections of material can be completely and uniformly cured. Thus, thick composite parts can now be fabricated and cured at any temperature at or above the glass transition temperature of the epoxy monomers in relatively short periods of time with minimal residual mechanical stresses.

The initiator (Part B) for the present invention is a material which produces a positively charged species (cation) when subjected to ionizing radiation. This positively charged species must then be capable of initiating the cationic polymerization of the epoxy (Part A). Much research has been devoted to the development of cationic photoinitators (J. V. Crivello, *Advances in Polymer Science*, Vol. 62, p. 1, 1984). Cationic photoinitiators react when subjected to visible or ultraviolet light of a particular wavelength to produce a cationic species, typically a Bronstead acid. The behavior of these materials when subjected to higher energy ionizing radiation as produced by an electron beam accelerator or a gamma cell cannot be predicted.

In order to determine which, if any, of the many commercially available and noncommercially available cationic photoinitiators were effective when subjected to ionizing radiation, a variety of cationic photoinitiators were evaluated using a $^{60}$Co gamma cell. The photoinitiator at a concentration of one part per hundred active materials was mixed with each of a variety of epoxy resins. The mixture was then placed in a gamma cell at a dose rate of 100 Gy per minute. The temperature increase (exotherm of the curing reactions) of the sample versus that of an inert reference material (water or cured resin) was measured (Tables 2 and 3). The dose at the exotherm peak and the effect of gamma radiation (total dosage, up to approximately 25 kGy) on the resins are listed. Some liquid resins in combination with certain initiators exhibited large exotherms and crosslinked to form hard cured materials. Other combinations exhibited little or no temperature increase and only small viscosity increases. This behavior could not have been predicted.

From the Tables it is clear that diaryliodonium salts and triarylsulfonuim salts of certain anions are particularly effective as initiators for the ionizing radiation induced cationic polymerization of epoxies. Many examples of each have been reported and some are commercially available. Almost all could be useful in the present invention.

Specific examples of diaryliodonium salts are given by the following formula, where $R_1$ and $R_2$ are radicals such as H, methyl, ethyl, n-propyl, isopropyl, n-butyl, tert-butyl, Cl, Br, $OC_nH_{2n+1}$, $OCH_2CH(CH_3)C_nH_{2n+1}$, $OCH_2CH(C_2H_5)C_nH_{2n+1}$, $OCH_2CH(OH)C_nH_{2n+1}$, $OCH_2CO_2C_nH_{2n+1}$, $OCH(CH_3)CO_2C_nH_{2n+1}$, $OCH(C_2H_5)CO_2C_nH_{2n+1}$, and mixtures thereof where n is an integer between 0 and 18:

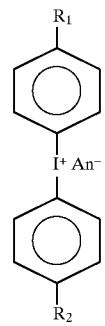

An$^-$ denotes the anion which may be hexafluoroarsenate (AsF$_6^-$), hexafluoroantimonate (SbF$_6^-$), hexafluorophosphate (PF$_6^-$), boron tetrafluoride (BF$_4^-$), trifluoromethane sulfonate (CF$_3$SO$_3^-$), or tetrakis (pentafluorophenylborate), (B[C$_6$F$_5$]$_4^-$). For example, OPPI of Tables 1–4 denotes (4-octyloxyphenyl) phenyliodonium hexafluoroantimonate ($R_1$=H, $R_2$=OC$_8$H$_{17}$, An$^-$=SbF$_6^-$). This initiator, which was obtained from General Electric Corporation as Aryl Fluoroantimonate Product 479-2092 was found to be particularly effective with certain epoxy resins. However, initiators with other $R_1$ and $R_2$ substituents would be expected to exhibit similar reactivities.

Specific examples of triarylsulfonium salts are given by the following formulas, where $R_3$ is H, methyl, ethyl, n-propyl, isopropyl, n-butyl, tert-butyl, phenylsulfide (PhS), or phenoxy (PhO) and An$^-$ denotes the anion, which may be the same as those of the diaryliodonium salts:

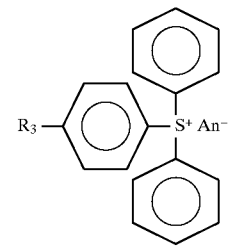

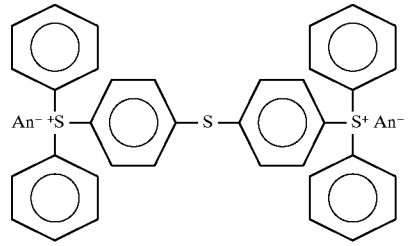

In Table 4 6974 and 6990 refer to CYRACURE UVI-6974 and CYRACURE UVI-6990, which were obtained from Union Carbide Corporation. These are mixtures of the triarylsulfonium salts given by the formulas where $R_3$ is phenylsulfide and An$^-$ are the hexafluoroantimonate and hexafluorophosphate anions, respectively. KI-85 and FX-512 in Table 3 denote Degussa Corporation DEGA-CURE KI-85 and 3M Corporation FX-512, respectively. These materials are both mixtures of triarylsulfonium hexafluorophosphate salts.

Table 1 lists glass transition temperatures and flexual moduli for various resin systems (Part A plus Part B) after curing-by electron beam radiation.

The impetus for developing Electron Beam (EB) curing of polymer matrix composites (PMCs) that incorporate epoxy resins is based primarily on reducing the manufacturing costs and cycle times in comparison with traditional thermal curing processes. One of the primary cost drivers in manufacturing with PMCs, and one of the elements having the greatest effect on quality and performance, is the standard thermal cure process. Thermal cure of PMCs requires relatively long cure times and high-energy consumption, creates residual thermal stresses, produces volatile toxic by-products during cure, requires the use of hardeners (curing agents) which limit the shelf life of the resin system, requires resin systems to be stored and transported under low temperature conditons before cure, and requires expensive tooling that is tolerant to high temperatures (i.e., 250° to 750° F.).

EB curing is a nonthermal curing method that uses high-energy, high-power electrons to initiate polymerization and cross-linking reactions at controlled rates in EB curable materials to enhance specific physical, mechanical, and chemical properties. EB curing can eliminate or reduce many of the shortcomings of thermal curing and facilitate technical developments that are presently unachievable utilizing thermal curing technology.

Four advantages are offered by EB curing compared to traditional Thermal Curing:

Lower Manufacturing Costs: resulting from faster cures, lower energy consumption, the ability to use lighter and lower cost tooling, simplified transportation and storage of resin systems, and easier waste cleanup after fabrication.

Simplified Processing: resulting from selectable cure temperatures, minimal part and tool thermal mismatches, uniform and efficient cross-linking, unlimited resin pot life, elimination of hardeners in the resin system, reduction in resin viscosity variations, greater material integration flexibility, in-situ fabrication and curing capability, ability to cure parts up to about 12-inches thick, no part size limitations, and its ability to be retrofittable to traditional fabrication methods (i.e., automated tape and tow and fiber placement, filament winding, pultrusion, resin transfer molding), and the ability to be cured in either on-line or batch operations.

Environmentally Friendly: because it reduces toxic and volatile emissions and minimizes the use of solvents normally required for waste clean-up operations.

Improved Product Performance: by lowering residual and internal stresses, improving dimensional part quality, and the ability to tailor the material properties by controlling the cure depth and the degree of cure.

This subject invention provides the user an almost unlimited number of epoxy resin systems to choose from which meet the necessary performance requirements for given applications.

The benefits of PMCs have long been recognized for high-performance applications, but Amercian industry has not capitalized on the advantages of these materials because large-scale manufacturing of PMCs is cost prohibitive. One of the primary cost drivers in manufacturing PMC parts and structures is the manufacturing cycle times required to cure the mateirals. By utilizing the radiation curable materials discussed in this subject invention one can dramatically shorten the manufacturing time for producting these materials, thereby greatly improving the affordability and use of PMCs in many areas of the commercial sector, including aircraft, aerospace, automotive, marine, sporting goods, infrastructure, and construction industries.

Many companies involved in the manufacture of aircraft and aerospace products, automobiles, chemicals, adhesives, polymer matrix composites, marine products, reinforcement fibers, oil drilling platforms, and electron beam accelerators are extremely interested in this technology area.

The materials described in this invention also have enormous potential for reducing the final cost for products used in applications such as thick and thin coatings; tooling for manufacturing PMCs; encapsulants for electronic devices; adhesives for bonding PMCs, metals, ceramics, and other materials; and for manufacturing molded and cast parts.

While there has been shown and described what is at present considered the preferred embodiments of the invention, it will be obvious to those skilled in the art that various changes and modifications may be made therein without departing from the scope of the invention as defined by the appended claims.

TABLE 1

Results on EBeam Cured Resins and Resin Blends

| Resin, % | Resin, % | Photoinitiator | PI (Phr) | Dose (kGy) | Dry Tg or Wet Tg (48 hr. H$_2$O boil) | Tg, (°C.) Tan Delta | Tg, (°C.) Peak G" or E" | Tg Onset, (°C.) | Initial Service Temp. (°C. @ 0.5 G' or E') | E' - DMA Mod., Ksi (GPa) | % Wt. gain (after 48 hr. H$_2$O boil) |
|---|---|---|---|---|---|---|---|---|---|---|---|
| T123 | | IRG261 | 4 | 100 | dry | 54 | 30 | | 40 | | |
| T123 | | IRG261 | 3 | 100 | dry | 56 | 30 | | 40 | | |
| T123 | | IRG261 | 5 | 100 | dry | 72 | 130 | | 40 | | |
| T123 | | LM6974 | 0.5 | 100 | dry | 182 | 159 | | 59 | | |
| ERL 4299 | | OPPI | 3 | 100 | dry | 92 | 75 | 67 | 71 | 321 (2.21) | 3.85 |
| GY 502 | | OPPI | 2 | 100 | dry | 98 | 77 | 74 | 70 | 428 (2.95) | 1.31 |
| E862 | | UVI6974 | 0.5 | 100 | dry | 102 | 79 | | 75 | | |
| T123 | | UVl6974 | 1 | 100 | dry | 102 | 77 | | 77 | | |
| E862 | | OPPI | 0.5 | 100 | dry | 104 | 76 | | 74 | | |
| GY509 | | OPPI | 2 | 100 | dry | 105 | 90 | 85 | 79 | 371 (2.56) | 1.37 |
| T556, 80 | DY027, 20 | OPPI | 3 | 100 | wet | 107 | 85 | | | 352 (2.43) | 1.24 |
| T556, 60 | DY027, 20 | OPPI | 3 | 100 | dry | 116 | 98 | 93 | 85 | 379 (2.61) | 1.24 |
| CY 9729 | | OPPI | 3 | 100 | dry | 121 | 67 | 74 | 68 | 259 (1.78) | |
| T123 | | UVI6974 | 2 | 100 | dry | 121 | 92 | | 89 | | |
| E862 | | UVI6974 | 1 | 100 | dry | 124 | 92 | | 89 | | |
| T123 | | OPPI | 5 | 100 | dry | 124 | 92 | | 92 | | |
| D431 | | OPPI | 1 | 100 | dry | 128 | 81 | 76 | 86 | 505 (3.48) | |
| T123 | | UVI6974 | 5 | 100 | dry | 129 | 79 | | 82 | | |

TABLE 1-continued

Results on EBeam Cured Resins and Resin Blends

| Resin, % | Resin, % | Photoinitiator | PI (Phr) | Dose (kGy) | Dry Tg or Wet Tg (48 hr. H$_2$O boil) | Tg, (°C.) Tan Delta | Tg, (°C.) Peak G" or E" | Tg Onset, (°C.) | Initial Service Temp. (°C. @ 0.5 G' or E') | E' - DMA Mod., Ksi (GPa) | % Wt. gain (after 48 hr. H$_2$O boil) |
|---|---|---|---|---|---|---|---|---|---|---|---|
| E862, 80 | PY322, 20 | OPPI | 3 | 150 | dry | 129 | 112 | | 102 | | |
| E862 | | UVI6974 | 5 | 100 | dry | 131 | 107 | | 100 | | |
| T123 | | CD-1012 | 1 | 150 | dry | 131 | 94 | | 131 | | |
| T123 | | LM6974 | 4 | 100 | dry | 134 | 92 | | 87 | | |
| T123 | | UVI6974 | 3 | 100 | dry | 134 | 92 | | 94 | | |
| E862 | | UVI6974 | 2 | 100 | dry | 134 | 107 | | 95 | | |
| D431, 100 | | OPPI | 1 | 100 | wet | 142 | 133 | | 119 | 423 (2.91) | 2.05 |
| E862 | | UVI8974 | 4 | 100 | dry | 144 | 124 | | 117 | | |
| D431, 100 | | OPPI | 2 | 100 | wet | 147 | 135 | | 123 | 415(2.86) | 2.13 |
| 2258 | | OPPI | 1 | 100 | wet | 147 | 123 | | 103 | 400 (2.76) | 5.98 |
| D431 | | OPPI | 2 | 100 | dry | 147 | 107 | 93 | 99 | 469 (3.23) | |
| T556, 90 | DY023, 10 | OPPI | 3 | 100 | dry | 180 | 126 | 125 | 109 | 424(2.92) | 1.47 |
| ERL 4205 | | OPPI | 2 | 100 | dry | 148 | 85 | 198 | 133 | 563 (3.88) | |
| E862 | | UVI6974 | 3 | 100 | dry | 149 | 102 | | 104 | | |
| T556, 80 | DYQ23, 20 | OPPI | 3 | 100 | dry | 150 | 135 | 132 | 118 | 476 (3.28) | 1.24 |
| LY9703 | | OPPI | 2 | 100 | wet | 151 | 133 | | | 265 (1.83) | 1.39 |
| T123 | | OPPI | 2 | 100 | wet | 156 | 138 | | | 388 (2.67) | 2.09 |
| D354 | | OPPI | 2 | 100 | dry | 157 | 148 | 144 | 126 | 421 (2.90) | 1.27 |
| PY306 | | OPPI | 4 | 100 | dry | 160 | 144 | | 130 | 440 (3.03) | 1.21 |
| D431, 100 | | OPPI | 4 | 100 | wet | 160 | 138 | | | 417 (2.87) | 2.28 |
| CY179 | | OPPI | 1 | 100 | dry | 160 | 129 | 73 | 110 | 501 (3.45) | |
| E862, 100 | | OPPI | 2 | 100 | dry | 161 | 149 | 144 | 128 | 505 (3.48) | 1.51 |
| E862, 47.5 | T742, 475 + Eth. Glycol, 5 | OPPI | 3 | 150 | dry | 161 | 136 | | 116 | | |
| E862 | | OPPI | 4 | 100 | dry | 181 | 134 | | 133 | | |
| T556 | | DPISbF6 | 3 | 150 | wet | 162 | 143 | | | 427 (2.94) | 2.43 |
| E862 | | OPPI | 5 | 100 | dry | 182 | 129 | | 121 | | |
| HPT1079 | | OPPI | | 50 | dry | 162 | 141 | | 139 | | |
| PY306, 100 | | OPPI | 2 | 100 | dry | 163 | 154 | | 130 | 446 (3.07) | 1.27 |
| 2258 | | OPPI | 1 | 100 | dry | 163 | 85 | 113 | 97 | 575 (3.96) | 5.98 |
| E862 | | OPPI | 3 | 100 | dry | 164 | 141 | | 134 | | |
| D431, 100 | | OPPI | 3 | 100 | wet | 166 | 145 | | | 416 (2.87) | 1.94 |
| E662 | | RP-DW | 1 | 150 | dry | 167 | 154 | | 144 | | |
| E662 | | OPPI | 1 | 100 | dry | 167 | 156 | | 146 | | |
| E862 | | OPPI | 1 | 100 | dry | 167 | 167 | | 146 | | |
| E862 | | OPPI | 2 | 100 | dry | 167 | 154 | | 147 | | |
| LY9703 | | OPPI | 2 | 100 | dry | 168 | 156 | 151 | 129 | 422 (2.91) | 1.39 |
| PY306, 100 | | OPPI | 2 | 100 | dry | 168 | 150 | 141 | 134 | 489 (2.82) | 1.75 |
| D431, 100 | | OPPI | 5 | 100 | wet | 170 | 142 | | 135 | 230 (1.58) | 2.08 |
| GY281 | | OPPI | 2 | 100 | dry | 171 | 159 | | 130 | 435 (3.00) | 1.53 |
| E862, 47.5 | T742, 47.5 + Tone 301.5 | OPPI | 3 | 150 | dry | 172 | 149 | | 143 | | |
| E862, 45 | T123, 45 + Vect. 4020 | OPPI | 3 | 150 | dry | 172 | 146 | | 146 | | |
| T123, 80 | OH-term. Udel (2650), 20 | OPPI | 3 | 150 | dry | 172 | 162 | | 154 | | |
| PY306, 75 | T556, 25 | OPPI | 2 | 100 | dry | 173 | 158 | 152 | 136 | 484 (3.34) | 1.66 |
| GY308 | | OPPI | 2 | 100 | dry | 174 | 158 | 153 | 133 | 421 (2.9)) | 1.48 |
| T123 | | OPPI | 5 | 100 | dry | 174 | 151 | | 146 | | |
| T556 | | OPPI | 3 | 150 | wet | 175 | 156 | | | 286 (1.98) | 2.i |
| T123, 80 | OH-term. Udel (8890). 20 | OPPI | 3 | 150 | dry | 177 | 169 | | 155 | | |
| E862, 75 | T556, 25 | OPPI | 2 | 100 | dry | 178 | 163 | 158 | 137 | 503 (3.47) | 1.88 |
| CY179, 75 | T556, 25 | OPPI | 2 | 100 | dry | 178 | 153 | 147 | 138 | 518 (3.87) | 4.76 |
| T123 | | RP-DW | 1 | 150 | dry | 179 | 152 | | 139 | | |
| T123 | | OPPI | 4 | 100 | dry | 179 | 167 | | 156 | | |
| T556, 90 | DY023, 10 | OPPI | 3 | 100 | dry | 180 | 165 | 163 | 138 | 552 (3.50) | 1.59 |
| 2258 | | OPPI | 5 | 100 | dry | 180 | 163 | 163 | 142 | 505 (3.48) | 5.05 |
| E662, 75 | T742, 25 | OPPI | 1 | 150 | dry | 181 | | 162 | 156 | | |
| E662, 75. | T742, 25 | OPPI | 3 | 100 | dry | 181 | 162 | | 156 | | |
| T123 | | OPPI | 3 | 100 | dry | 182 | 164 | | 156 | | |
| T123 | | OPPI | 3 | 150 | dry | 182 | 164 | | 156 | | |
| D383, 100 | | OPPI | 2 | 100 | dry | 183 | 170 | 164 | 143 | 498 (3.43) | 2.1 |
| CY179, | T742, 25 | OPPI | 2 | 100 | dry | 183 | 150 | 145 | 129 | 566 (3.90) | 5.59 |

TABLE 1-continued

Results on EBeam Cured Resins and Resin Blends

| Resin, % | Resin, % | Photoinitiator | PI (Phr) | Dose (kGy) | Dry Tg or Wet Tg (48 hr. H₂O boil) | Tg, (°C.) Tan Delta | Tg, (°C.) Peak G" or E" | Tg Onset, (°C.) | Initial Service Temp. (°C. @ 0.5 G' or E') | E' - DMA Mod., Ksi (GPa) | % Wt. gain (after 48 hr. H₂O boil) |
|---|---|---|---|---|---|---|---|---|---|---|---|
| 75 |  |  |  |  |  |  |  |  |  |  |  |
| E862, 75 | T742, 25 | OPPI | 1 | 100 | dry | 185 |  | 164 | 162 |  |  |
| D383 |  | OPPI | 3 | 100 | dry | 186 | 172 | 166 | 142 | 441 (3.04) | 2.04 |
| T123 |  | OPPI | 2 | 100 | dry | 185 | 174 | 166 | 138 | 440 (3.03) | 2.09 |
| PY306, 75 | T742, 25 | OPPI | 2 | 100 | dry | 187 | 165 | 160 | 138 | 505 (3.49) | 1.74 |
| T138 |  | OPPI | 2 | 100 | dry | 187 | 175 | 167 | 142 | 432 (2.98) | 1.91 |
| D431 |  | OPPI | 4 | 100 | dry | 187 | 156 | 155 | 129 | 473 (3.26) |  |
| T123 |  | RP-OW | 2 | 150 | dry | 187 | 157 |  | 142 |  |  |
| PY306, 50 | T556, 50 | OPPI | 2 | 100 | dry | 188 | 173 | 165 | 146 | 476 (3.28) | 2.02 |
| 2258 |  | OPPI | 4 | 100 | dry | 188 | 170 | 171 | 144 | 498 (3.43) | 5.23 |
| E862, 75 | T742, 25 | OPPI | 2 | 100 | dry | 189 | 174 | 149 | 140 | 476 (329) | 1.92 |
| E662, 75 | T742, 25 | OPPI | 1 | 50 | dry | 189 | 158 |  | 154 |  |  |
| D383, 75 | T556, 25 | OPPI | 2 | 100 | dry | 191 | 176 | 174 | 143 | 501 (3.46) | 2.26 |
| E862, 45 | T742, 45 + SR 297, 10 | OPPI | 3 | 150 | dry | 191 | 144 |  | 156 |  |  |
| T556 |  | RP-SH | 3 | 150 | wet | 192 | 162 |  |  | 390 (2.69) | 1.03 |
| 2258 |  | OPPI | 3 | 100 | dry | 192 | 174 | 175 | 147 | 502 (3.46) | 5.3 |
| T123, 80 | Imitec. 20 | OPPI | 3 | 150 | dry | 192 | 182 |  | 164 |  |  |
| E862, 50 | T556, 50 | OPPI | 2 | 100 | dry | 193 | 178 | 177 | 148 | 479 (3.30) | 2.06 |
| D431 |  | OPPI | 3 | 100 | dry | 193 | 171 | 169 | 142 | 481 (3.31) |  |
| E862, 75 | T742 25 | OPPI | 1 | 100 | dry | 194 | 157 |  | 157 |  |  |
| E862, 75 | T742 25 | OPPI | 1 | 100 | dry | 194 | 157 |  | 157 |  |  |
| E862, 75 | T742 25 | OPPI | 3 | 150 | dry | 194 | 162 |  | 158 |  |  |
| T123 |  | OPPI | 2 | 100 | dry | 194 | 181 |  | 184 |  |  |
| D383, 50 | T556 SQ | OPPI | 2 | 100 | dry | 197 | 182 | 180 | 150 | 503 (3.47) | 2.17 |
| D431 |  | OPPI | 5 | 100 | dry | 197 | 176 | 169 | 143 | 458 (3.16) |  |
| E862, 45 | T742 45 + Ebecryl 639. 10 | OPPI | 3 | 150 | dry | 201 | 189 |  | 187 |  |  |
| D383, 75 | T742, 25 | OPPI | 2 | 100 | dry | 203 | 188 | 182 | 158 | 504 (3.47) | 2.48 |
| E862, 25 | T742, 75 | OPPI | 1 | 150 | dry | 204 | 106 |  | 154 |  |  |
| T123, 50 | T556, 50 | OPPI | 3 | 150 | dry | 204 | 192 |  | 170 |  |  |
| 2258 |  | OPPI | 2 | 100 | dry | 2Q5 | 155 | 184 | 142 | 494 (3.40) | 5.49 |
| PY306, 50 | T742, 50 | OPPI | 2 | 100 | dry | 206 | 164 | 167 | 148 | 502 (3.46) | 2.59 |
| CY179, 50 | T556, 50 | OPPI | 2 | 100 | dry | 206 | 184 | 179 | 182 | 518 (3.56) | 3.86 |
| E862, 50 | T742, 50 | OPPI | 3 | 150 | dry | 206 | 186 |  | 175 |  |  |
| E862, 25 | T556, 75 | OPPI | 2 | 100 | dry | 2Q7 | 191 | 192 | 124 | 552 (3.80) | 2.25 |
| T123 |  | OPPI | 1 | 100 | dry | 2Q7 | 131 |  | 142 |  |  |
| D383, 25 | T556, 75 | OPPI | 2 | 100 | dry | 206 | 196 | 197 | 146 | 523 (3.61) | 2.24 |
| E862, 50 | T742, 50 | OPPI | 2 | 100 | dry | 211 | 194 | 187 | 159 | 292 (2.01) | 2.75 |
| E882, 25 | D438, 75 | OPPI | 1 | 150 | dry | 216 | 189 |  | 191 |  |  |
| D383, 50 | T742, 50 | OPPI | 2 | 100 | dry | 222 | 102 | 200 | 171 | 567 (3.91) | 3.61 |
| CY179, 50 | T742, 50 | OPPI | 2 | 100 | dry | 224 | 183 | 167 | 172 | 561 (3.87) | 5.89 |
| T556 |  | OPPI | 2 | 100 | dry | 225 | 128 | 212 | 110 | 533 (3.68) | 2.28 |
| T556 |  | OPPI | 3 | 150 | dry | 229 | 211 |  | 169 |  |  |
| CY179, 25 | T742, 75 | OPPI | 2 | 100 | dry | 240 | 114 |  | 204 | 492 (3.39) | 5.69 |
| D383, 25 | T742, 75 | OPPI | 2 | 100 | dry | 242 | 107 | 217 | 203 | 542 (3.74) | 3.97 |
| T742 |  | OPPI | 3 | 150 | dry | 382 |  |  | 299 |  |  |
| T556 |  | RP-DW | 3 | 150 | dry | 189, 244 | 184, 224 |  | 179 |  |  |
| T123, 80 | E2330, 20 | OPPI | 3 | 150 | dry | 72, 177 | 62 |  | 70 |  |  |
| THF, 10 | T556, 90 | OPPI | 3 | 150 | dry | 82, 162 | 82, 154 |  | 139 |  |  |
| E862, 25 | T742, 75 | OPPI | 2 | 100 | dry |  |  |  | 198 | 517 (3.56) | 3.66 |
| PY306, 25 | T742, 75 | OPPI | 2 | 100 | dry |  |  |  | 191 | 571 (3.94) | 3.95 |
| T742 |  | OPPI | 2 | 100 | dry |  |  |  | 226 | 581 (4.00) | 4.66 |
| E862 |  | IRG261 | 5 | 100 | dry |  |  |  | 44 |  |  |
| E862 |  | IRG261 | 3 | 100 | dry |  |  |  | 49 |  |  |
| E862 |  | IRG261 | 4 | 100 | dry |  |  |  | 56 |  |  |
| E862, 75 | T742, 25 | OPPI | 1 | 50 | dry |  |  |  | 101 |  |  |

TABLE 2

Gamma Screening Studies Using The OPPI Photoinitiator and Various Resin Systems

| Resin System | % of Each Component | Phr OPPI | Gamma ΔT (°C.) (relative to reference) | Dose @ Peak Exotherm (kGy) | Physical Effect @ RT |
|---|---|---|---|---|---|
| Bisphenol A based Epoxies | | | | | |
| Tactix 123 | 100 | 0.5 | (30.6[1]) | | |
| Tactix 123 | 100 | 1 | 27.8 (40.2[1]) | 5.8 | H |
| Tactix 123 | 100 | 2 | 59.4 (43.9[1]) | 8.1 | H |
| Tactix 123 | 100 | 3 | (60.1[1]) | | |
| Tactix 123 | 100 | 4 | 62.8 (58.7[1]) | 7.4 | H |
| Tacttx 123 | 100 | 5 | (21.1[1]) | | |
| Tactix 138 | 100 | 1 | 34.3 | 5.4 | H |
| Epon 828 | 100 | 1 | 34 | 6.4 | H |
| Bisphenol F (Epoxy Novolac) based Epoxies | | | | | |
| Epon 862 | 100 | 0.25 | 17.8 | 9 | H |
| Epon 862 | 100 | 0.5 | 32.8 (41.2[1]) | 6.6 | H |
| Epon 862 | 100 | 1 | 42.4 (57.4[1]) | 6.4 | H |
| Epon 662 | 100 | 2 | 62.8 (66.5[1]) | 6 | H |
| Epon 862 | 100 | 3 | (78.4[1]) | | |
| Epon 862 | 100 | 4 | 73.5 (77.8 [1]) | 8.2 | H |
| Epon 862 | 100 | 5 | (70.7[1]) | | |
| DEN 431 | 100 | 1 | 52.6 | 5.2 | H |
| Epon 862/DEN 438 | 25/75 | 1 | 18.9 | 3.6 | H |
| DEN 438 | 100 | 1 | 3 | 6.1 | H |
| Multifunctional Epoxies & Blends w/ Other Materials | | | | | |
| Epon 862/Epon 1031 | 50/50 | 1 | 4.7 | 14.5 | H |
| Epon 862/Epon 1031 | 50/50 | 2 | 3.6 | 10.9 | H |
| Epon 862/Epon 1031 | 50/50 | 4 | 4.4 | 14.3 | H |
| Epon 862/HPT 1079 | 50/50 | 1 | 1.7 | 5.7 | S |
| Epon 862/Tactix 556 | 75/25 | 1 | 33.6 | 5.7 | H |
| Epon 862/Tactix 556 | 50/50 | 1 | 26.7 | 5.8 | H |
| Epon 862/Tactix 556 | 25/75 | 1 | 9.4 | 6 | H |
| Tactix 556 | 100 | 1 | 1 | 8.7 | H |
| Epon 862/Tactix 742 | 75/25 | 1 | 37.7 | 12.1 | H |
| Epon 862/Tactix 742 | 50/50 | 1 | 18.2 | 17.2 | H |
| Epon 862/Tactix 742 | 50/50 | 3 | 20.1 | 16.6 | H |
| Epon 862/Tactix 742 | 25/75 | 1 | 9.6 | 19 | H |
| Tactix 742 | 100 | 1 | 1.9 | 74 | H |
| Epon 862/Tactix 742/Vectomer 4020 | 45/45/10 | 3 | 7 | 9.5 | H |
| Epon 862/Tactix 742/Ebecryl 639 | 45/45/10 | 3 | 3.4 | 18.4 | S |
| Tactix 742/ERL 4205/Vectomer 4020 | 45/45/10 | 3 | 5.2 | 13.2 | H? |
| Tactix 742/ERL 4205 | 50/50 | 3 | 3.6 | 13.2 | S? |
| Cycloaliphatic based Epoxies | | | | | |
| ERL 4205 | 100 | 1 | 1.8 | 10.1 | VI |
| ERL 4205 | 100 | 2 | 3.4 | 7.8 | VI |
| ERL 4205 | 100 | 4 | 5.6 | 7.7 | VI |
| ERL 2258 | 100 | 1 | 18.3 | 5.4 | H |
| ERL 4617 | 100 | 1 | 0.6 | 0.2 | VI |
| CY-179 | 100 | 1 | 7.4 | 8.6 | H |
| Other Materials | | | | | |
| DVE-3 | 100 | 0 | 2.3 | 4.5 | NC |
| DVE-3 | 100 | 1 | 109.3 | 0.2 | H* |
| Vectomer 4010 | 100 | 0 | 4.7 | 1.7 | NC |
| Vectomer 4010 | 100 | 1 | 91.7 | 1.1 | H |
| Vectomer 4020 | 100 | 0 | 7.4 | 1.7 | VI |
| Vectomer 4020 | 100 | 1 | 75.1 | 0.4 | H |
| DER 736 | 100 | 1 | 105.6 | 6.7 | H* |

Notes:
[1]Performed at a different time.
H — Hard, MH — Medium Hard, S — Soft, VI — Viscosity increase, NC — No Change, S-H — Soft after iradiation, then Hard next day, NC-S — No Change after iradiation, then Soft next day.
?Exothermed in oven.
*Cured very vigorously.

TABLE 3

Gamma Screening Studies Using Various Photoinitiators and Resin Systems

| Resin System | % | PI | PI Phr | Gamma ΔT (°C.) (relative to reference) | Dose @ Peak Exotherm (kGy) | Effect @ RT |
|---|---|---|---|---|---|---|
| Bisphenol A based Epoxies | | | | | | |
| Tactix 123 | 100 | OPPI | 0.5 | (30.6[1]) | | |
| Tactix 123 | 100 | OPPI | 1 | 27.8 (40.2[1]) | 5.8 | H |
| Tactix 123 | 100 | OPPI | 2 | 59.4 (43.9[1]) | 6.1 | H |
| Tactix 123 | 100 | OPPI | 3 | (60.1[1]) | | |
| Tactix 123 | 100 | OPPI | 4 | 62.8 (58.7[1]) | 7.4 | H |
| Tactix 123 | 100 | OPPI | 5 | (21.1[1]) | | |
| Tactix 123 | 100 | DPIAsF$_6$ | 1 | 12.4 | 3.5 | H |
| Tactix 123 | 100 | DPIPF$_6$ | 1 | 8.2 | 5.6 | MH |
| Tactix 123 | 100 | 6974 | 2 (1% Active) | 4.2 | 9.9 | S–H |
| Tactix 123 | 100 | 6990 | 2 (1% Active) | 4 | 8.7 | NC–S |
| Tactix 123 | 100 | KI-85 | 2 (1% Active) | 3.3 | 8.7 | NC–S |
| Tactix 123 | 100 | IRG.261 | 1 | 3 | 9.2 | VI |
| Tactix 123 | 100 | IRG.261 | 4 | (3[1]) | | |
| Tactix 123 | 100 | DPITF | 1 | 1.8 | 6.1 | NC |
| Tactix 138 | 100 | OPPI | 1 | 34.3 | 6.4 | H |
| Epon 828 | 100 | OPPI | 1 | 34 | 6.4 | H |
| Bisphenol F (Epoxy Novolac) based Epoxies | | | | | | |
| Epon 862 | 100 | OPPI | 0.25 | 17.8 | 9 | H |
| Epon 862 | 100 | OPPI | 0.5 | 32.8 (41.2[1]) | 6.6 | H |
| Epon 862 | 100 | OPPI | 1 | 42.4 (57.4[1]) | 6.4 | H |
| Epon 862 | 100 | OPPI | 2 | 62.8 (68.5[1]) | 6 | H |
| Epon 862 | 100 | OPPI | 3 | (78.4[1]) | | |
| Epon 862 | 100 | OPPI | 4 | 73.5 (77.8[1]) | 8.2 | H |
| Epon 862 | 100 | OPPI | 5 | (70.7[1]) | | |
| Epon 862 | 100 | BBI-103 | 1 | (14.2[1]) | (7.2[1]) | (H[1]) |
| Epon 862 | 100 | BBI-103A | 1 | (10.5[1]) | (10[1]) | (H[1]) |
| Epon 862 | 100 | 5974 | 5 (.25% Active) | (7.4[1]) | | |
| Epon 862 | 100 | 6974 | 1 (0.5% Active) | (7.9[1]) | | |
| Epon 862 | 100 | 6974 | 2 (1% Active) | 6.6 (7.1[1]) | 3.4 | S–H |
| Epon 862 | 100 | 6974 | 3 (1.5% Active) | (6.6[1]) | | |
| Epon 862 | 100 | 6974 | 4 (2% Active) | (6.9[1]) | | |
| Epon 862 | 100 | 6974 | 5 (2.5% Active) | (2.5[1]) | | |
| Epon 862 | 100 | KI-85 | 2 (1% Active) | 4.3 | 4.2 | NC–S |
| Epon 862 | 100 | IRG.261 | 4 | (3[1]) | | |
| Epon 862 | 100 | BBI-102 | 1 | (3.9[1]) | (4.3[1]) | (H[1]) |
| Epon 862 | 100 | 6990 | 2 (1% Active) | 3.4 | 4.2 | NC–S |
| Epon 862 | 100 | BBI-101 | 1 | (0.6[1]) | (0[1]) | (S[1]) |
| Epon 862 | 100 | BBI-105 | 1 | (0.5[1]) | (0[1]) | (S[1]) |
| Epon 862 | 100 | BDS-105 | 1 | (0.4[1]) | (0[1]) | (S[1]) |
| Epon 862 | 100 | TAZ-101 | 1 | (0.4[1]) | (0[1]) | (S[1]) |
| Epon 862 | 100 | DPDS | 1 | (0.2[1]) | (0[1]) | (S[1]) |
| DEN 431 | 100 | OPPI | 1.2 | 52.6 | 5.2 | H |
| DEN 438 | 100 | OPPI | 1 | 3 | 6.1 | H |
| DEN 438 | 100 | 6974 | 2 (1% Active) | 0.6 | 0.2 | H |
| DEN 438 | 100 | 6990 | 2 (1% Active) | 0.6 | 0.2 | MH |
| DEN 438 | 100 | FX-512 | 1.7 (1% Active) | 4.1 | 79 | S |
| DEN 438 | 100 | KI-85 | 2 (1% Active) | 0.6 | 0.2 | S |
| Multifunctional Epoxies | | | | | | |
| Tactix 556 | 100 | OPPI | 1 | 1 | 8.7 | H |
| Tactix 742 | 100 | OPPI | 1 | 1.9 | 7.4 | H |
| HPT 1079 | 100 | 6974 | 2 (1% Active) | 1 | 4.4 | H |
| Epoxy Blends | | | | | | |
| Epon 862/Tactix 742 | 50/50 | BBI-103 | 1 | (8.8[1]) | (17[1]) | (H[1]) |
| Epon 862/Tactix 742 | 50/50 | BBI-103A | 1 | (3.2[1]) | (12[1]) | (H[1]) |
| Epan 862/Tactix 742 | 50/50 | BBI-102 | 1 | (1.5[1]) | (15[1]) | (H[1]) |
| Epon 862/Tactix 742 | 50/50 | BBI-105 | 1 | (1.3[1]) | (0[1]) | (S[1]) |
| Epon 862/Tactix 742 | 50/50 | BBI-101 | 1 | (0.9[1]) | (0[1]) | (S[1]) |
| Epan 862/Tactix 742 | 50/50 | TAZ-101 | 1 | (0.6[1]) | (0[1]) | (S[1]) |
| Epon 862/Tactix 742 | 50/50 | BDS-105 | 1 | (0.4[1]) | (0[1]) | (S[1]) |
| Epon 862/Tactix 742 | 50/50 | DPDS | 1 | (0.1[1]) | (0[1]) | (S[1]) |

TABLE 3-continued

Gamma Screening Studies Using Various Photoinitiators and Resin Systems

| Resin System | % | PI | PI Phr | Gamma ΔT (°C.) (relative to reference) | Dose @ Peak Exotherm (kGy) | Effect @ RT |
|---|---|---|---|---|---|---|
| Cycloaliphatic based Epoxies | | | | | | |
| ERL 4205 | 100 | OPPI | 1 | 1.8 | 10.1 | VI |
| ERL 4205 | 100 | OPPI | 2 | 3.4 | 7.8 | VI |
| ERL 4205 | 100 | OPPI | 4 | 5.6 | 7.7 | VI |
| ERL 4205 | 100 | DPIAsF$_6$ | 1 | 2.4 | 6 | VI |
| ERL 4205 | 100 | DPIPF$_6$ | 1 | 2 | 7.9 | VI |
| ERL 4205 | 100 | 6974 | 2 (1% Active) | 1.9 | 6.3 | VI |
| ERL 4205 | 100 | DPITF | 1 | 1.5 | 9.9 | VI |
| ERL 2258 | 100 | OPPE | 1 | 18.3 | 5.4 | H |
| ERL 2258 | 100 | 6974 | 2 (1% Active) | 5.1 | 4.6 | S |
| ERL 4617 | 100 | OPPI | 1 | 0.6 | 0.2 | VI |
| CY-179 | 100 | OPPI | 1 | 7.4 | 8.6 | H |
| CY-179 | 100 | DPIAsF$_6$ | 1 | 2.3 | 7.2 | S |
| CY-179 | 100 | OPIPF$_6$ | 1 | 1.6 | 7.2 | VI |
| CY-179 | 100 | DPITF | 1 | 0.9 | 0.8 | NC |

[1]Performed at a different time.

TABLE 4

Description of Materials

| Resins | Description | Viscosity at 25° C., cps | W.P.E. (EEW) |
|---|---|---|---|
| Bisphenol A based Epoxies | | | |
| Dow Tactix 123 | High purity, low viscosity digiycidyl ether of Bisphenol A based liquid epoxy resin. | 4,400–5,600 | 172–175 |
| Dow Tactix 138 | High purity, low viscosity diglycidyl ether of Bisphenol A based liquid epoxy resin. | 9,200–9,800 | 178–182 |
| Dow D.E.R. 383 | Low visc. BPA resin. | 9,000–10,500 | 176–183 |
| Shell Epon 828 | Diglycidyl ether of Bisphenol A based liquid epoxy resin. Same as Araldite GY 2600 or GY 6010 or Dow DER 331. | 11,000–15,000 | 185–192 |
| Diluted/Modified Liquid Epoxies | | | |
| Araldite GY 502 | BPA epoxy resin diluted w/ dibutyl phthalate (a non-reactive diluent that increases resiliency of cured product). | 2,100–3,100 | 230–250 |
| Araldite GY 509 | BPA liquid epoxy resin diluted w/ an alkyl glycidyl ether (D 027 a mono func. reac. diluent containing C$_8$ & C$_{10}$ alkyl groups). | 500–700 | 189–200 |
| Flexible Epoxy Resins | | | |
| Araldite PY 322 | Modified BPA diglycidyl ether flexible epoxy resin. Chemical identity trade secret. The flexibility and toughness in this matl. results in improved impact resis. | 2000–5000 | 317–357 |
| Bisphenol F (Epoxy Novoiac) based Epoxies | | | |
| Araldite PY 308 | Bisphenol F epoxide reactive diluent. Very low viscosity. | 1,200–1,800 | 159–170 |
| Araldite LY 9703 | Epoxy phenol novolac resin, EPN (Methane, bis[(2,3-epoxypropoxy)phenyl]. Lower visc. Bis F resin. | 3,000–4,000 | 160–180 |
| Dow D.E.N. 354 | Bisphenol F epoxy resin that is a low molec. wt. member of the Dow Epoxy Novolac family. Features low functionality (only 2.1) and low viscosity. Is very resistant to strong solvents (acetone, CH$_3$OH) or conc. sulfuric acid compared to conv. epoxies. | 3900 | 172 |
| Shell Epon 862 | Diglycidyl ether of Bisphenol F based liquid epoxy resin. Is similar to Dow DER 354. | 3,000–4,500 | 166–177 |

TABLE 4-continued

Description of Materials

| | | | |
|---|---|---|---|
| Araldite GY 281 | Epoxy phenol novolac resin, EPN. Better chem. resis. esp. to organic solvents than Araldite GY 6010. Low visc., good flexibility. | 5,000–7,000 | 158–175 |
| Araldite GY 308 (GY 302-2) | BPA diglycidyl ether [Phenol, 4,4'-(1-methylethylidene)bis-, polymer w/ (chloromethyl)oxirane], w/ epoxy phenol novolac resin. Non crystallizing, good chem/solvent resis., low visc., excellent mechanicals. | 6,500–8,000 | 173–182 |
| Dow D.E.N. 431 | Epoxy phenolic novolac resin with a functionality of 2.2. Same as Araldite EPN 1139. | 1,100–1,700 @125° F. | 172–179 |
| Dow D.E.N. 438 | High viscosity epoxy phenolic novolac resin with a functionality of 3.6. Same as EPN 1138. | 20,000–70,000 @125° F. | 176–181 |
| Multifunctional Epoxies | | | |
| Dow Tactix 556 | Semi-solid epoxy novolac w/ a functionality of 2.2 & a lower moisture abs. than many mult-func. epoxies used in advcd. comps. The dicyclopentadiene backbone has extremely low avg. molecular polarity (lower than DEN 431 or 438). | 1,000–1,500 @ 85° C. or 185° F. | 220–240 |
| Dow Tactix 742 | Semi-solid trifunctional epoxy composed of triglycidyl ether of tris (4-hydroxyphenyl)methane-based epoxy. Tactix 742 has the highest dry Tg of any Tactix resin. | 2,860 @ 79° C. or 175° F. | 150–170 |
| Shell Epon 1031 | High performance solid epoxy resins w/ funtionalities of 3.5 and w/ no amine present. Same as Araldite MT 0163. | $Z_2$–$Z_7$ | 200–240 |
| Shell Epon HPT 1079 | A difunctional epoxy based on bisphenol-9-fluorenone w/ a m.p. = 74–85° C. | 50–70 @ 350° F. | 240–270 |
| Cycloaliphatic based Epoxies | | | |
| Ciba Araldite CY 179 | 100% 3',4'-Epoxy Cyclohexylmethyl 3,4-Epoxycydohexanecarboxylate. is a low visc., high Tg, brittle allcyclic di-epoxy carboxylate, mp = –37° C. (–35° F.), mw = 252.30. Same as Union Carbide ERL 4221 or UVR 6110. | 350–450 | 131–143 |
| Union Carbide ERL 4205 | Contains isomeric mixtures of Bis (2,3-epoxycyclopentyl) ether. | <100 @ 45° C. | |
| Union Carbide ERL 2258 | Is a 50/50 blend of Bis(2,3-epoxycyclopentyl) ether (ERL 4205) + Diglycidylether of bisphenol A. | | |
| Union Carbide ERL 4299 | 100% Bis (3,4-Epoxy Cyclo Hexyl Methyl) Adipate. mp = 25° C.(–13° F.) mw = 366.45 | 550–750 | 190–210 |
| Union Carbide ERL 4617 | Isomeric mixtures of Bis (2,3-epoxycyclopentyl) ether (ERL 4205) + HOCH$_2$CH$_2$OH. Has extremely high resin modulus = 783 Ksi if cured w/ m-PDA. | 80–150 | |
| Ciba CY 9729 | 3,4-Epoxycyclohexylmethyl-3,4-epoxycyclohexane carboxylate. Toughened CY 179 material, two phase system, good thermal shock resis., HDT of 132° C. Contains reacted glycol. | 400–500 | 178–192 |
| Reactive Diluents | | | |
| Ciba DY 027 | Monofunctional epoxy. Alkyl glycidyl ether - alkyl groups are primarily C$_8$ and C$_{10}$. Very effective visc. reducer. | 5 to 15 | 215–235 |
| Ciba DY 023 | O-Cresyl glycidyl ether - mono functional epoxy - less volatile and better water resis. than RD-1. | 5 to 15 | 175–192 |
| Allied Signal VEctomer 4010 | Reactive diluent based on Bis (4-vinyloxybutyl)isophthalate w/ a MW = 348. | 85 | |
| Allied Signal VEctomer 4020 | Reactive diiuent based on Bis (4-vinyloxymethylcyclohexylmethyl) glutarate w/ a MW = 436. | 430 | |
| Other Materials | | | |
| THF | Tetrahydrofuran | | |
| Union Carbide Tone 301 | Caprolactone polyol crosslinker - hydroxyl equiv. wt. = 98–103. | 2250 | |

TABLE 4-continued

Description of Materials

Other Materials

| | | | |
|---|---|---|---|
| OH-term. Udel | Hydroxyl terminated Udel thermoplastic (3 diff. molec. wts = 2650, 5360, or 8890) | | |
| Imitec | Polyimide sulfone thermoplastic (Imitec) | | |
| Rohm & Haas E2330 | Core-shell rubber, EXL-2330 | | |
| Dow D.E.R. 736 | Shorter chain polyglycol di-epoxide than D.E.R. 732. | 30–60 30-6 | 175–205 |
| UCB Ebecryl 639 | Epoxy Novolac Acrylate | | |
| Sartomer SR 297 | 1,3-Butylene Glycol Dimethacrylate | | |
| Union Carbide Tone 301 | Union Carbide Caprolactone Polyol Crosslinkers. Hydroxyl Equiv. wt. = 98–103 | | |
| Ethylene Glycol | | | |

| Cationic Photoinitiators | Description | $\lambda$max. ($\epsilon$) |
|---|---|---|
| Union Carbide Cyracure UVI-6974 or Sartomer CD-1010 | Liquid that is 50% Mixed triarylsulfonium hexafluoroantimonate salfs & 50% Propylene Carbonate. bp = >220° C.(>428° F.), sp. gr. = 1.4, visc. = 21 cps. Is twice as efficient as 6990, therefore only requires half as much. | |
| Union Carbide Cyracure UVI 6990 or Sartomer CD-1011 | Liquid that is 50% Triaryl Sulfonium hexafluorophosphate salts & 50% Propylene Carbonate solvent. bp = >220° C.(>428° F.) sp. gr. = 1.35, visc. = 29 cps. | |
| Degussa Degacure KI 85 | Liquid that is 50% Triaryl sulfonium hexafluorophosphate & 50% propylene carbonate solvent. mp = −54° C., bp = 243° C., sp. gr. = 1.33 g/ml, visc. = 71.6 mPa · s | |
| 3M FX-512 | Liquid that is 1–5% Triphenyl sulfonium hexafluorphosphate w/ 48–66% Aromatic sulfonium coproducts & 40% 2(3H) Dihydrofuranone solvent. BP = 204° C., sp. gr. = 1.3. | |
| Ciba Irgacure 261 | ($n^5$-2,4-Cyclopentadien-1-yl)$n^6$-isopropylbenzene)-Iron(II) hexafluorophosphate. mp = 85–88° C. | |
| TCI DPIAsF6 | Diphenyliodonium hexafluoroarsenate. MW = 470.03. | |
| TCI DPIPF6 | Diphenyliodonium hexafluorphosphate. MW = 426.08, mp 146–148° C. | 210nm, 17,400 226nm, 16,900 |
| TCI DPITF | Diphenyliodonium triflate. MW = 430.19, mp = 178–179° C. | 230nm, 14,900 |
| GE OPPI | (4-Octyloxyphenyl)phenyliodonium hexafluoroantimonate (OPPI or Octacat), mp = 55–60° C. Soluble in DVE-3, ERL4221 or CY 179, etc. | |
| Sartomer CD-1012 | (2-hydroxytetradecyloxyphenyl) phenyliodonium hexafluoroantimonate | |
| RP-DW | Diphenyliodonium tetrakis (pentafluorophenylborate) | |
| RP-SH | Diphenyliodonium tetrakis (Pentafluorophenylborate) - made internally | |
| Midori BBI-101 | 98% Bis (4-tert-butylphenyl)iodonium fluoroborate. Is a crystalline powder w/ mp = 146–148° C. | 238nm, 20,800 |
| Midori BB-102 | 98% Bis(4-tert-butylphenyl)iodonium hexafluorophosphate. Is a crystalline powder w/a mp = 171–174° C. | 238nm, 20,000 |
| Midori BB-103 | 97% Bis(4-tert-butylphenyl)iodonium hexafluoroantimonate. Is a crystalline powder w/ a mp = 183–185° C. | 238nm, 21,200 |
| Midori BBI-105 | 97% Bis(4-tert-butylphenyl)iodonium triflate. Is a crystalline powder w/ a mp = 162–166° C. | |
| Midori BDS-105 | 97% (4-tert-Butylphenyl)diphenylsulfonium triflate. Is an oil. | |
| Midori TAZ-101 | 97% 2,4,6-Tris(trichloromethyl)-1,3,5-triazine. Is a crystalline powder w/ a mp = 95–96° C. | 220nm, 6585 285nm, 1656 |
| MMES BBI-103A | Diphenyliodonium hexafluorantimonate, mp = 108–110° C. | 210nm, 17200 225nm, 16,480 |
| MMES DPDS | Diphenyldisulfone. A crystalline powder w/ a mp = 192° C. | |

What is claimed is:

1. A non-thermal curing method characterized as not using external heat for curing an epoxy resin system comprising the following steps:

Step 1. providing a blend of an epoxy resin system, said epoxy resin system comprising an epoxy resin and a cationic photoinitiator, said cationic photoinitiator being a diaryliodonium salt; and Step 2. irradiating said blend with high energy electron beam ionizing radiation for a period of time sufficient to effectuate an efficient cross-linking and an essentially complete and uniform non-thermal curing of said epoxy resin system thereby forming a non-thermally cured epoxy resin system having a glass transition temperature essentially the same or greater than a glass transition temperature obtained by thermally curing said epoxy resin system.

2. A non-thermally cured epoxy resin system made by a method in accordance with claim 1.

3. The method according to claim 1, wherein said epoxy resin is selected from the group consisting of:
bisphenol F epoxies;
tetraglycidyl ether of tetrakis (4-hydroxyphenyl)ethane;
diglycidyl ether of 9,9-bis(4-hydroxyphenyl)fluorene;
glycidyl ethers of the product of condensation of dicyclopentadiene and phenol;
triglycidyl ether of tris(hydroxyphenyl)methane;
diglycidyl ester of hexahydrophthalic anhydride; and
mixtures of the above.

4. The method according to claim 3, wherein said epoxy resin is selected from the group consisting of:
bisphenol F epoxies;
tetraglycidyl ether of tetrakis (4-hydroxyphenyl)ethane;
diglycidyl ether of 9,9-bis(4-hydroxyphenyl)fluorene;
glycidyl ethers of the product of condensation of dicyclopentadiene and phenol;
triglycidyl ether of tris(hydroxyphenyl)methane; and
mixtures thereof.

5. A non-thermal curing method characterized as not using external heat for curing an epoxy resin in accordance with claim 1 where in said epoxy resin system consists essentially of an epoxy resin and a cationic photoinitiator, said epoxy resin being selected from the group consisting of: glycidyl ethers of bisphenol A, epoxy phenolic novolacs, epoxy cresol novolacs, bisphenol F epoxies, tetraglycidyl ether of tetrakis (4-hydroxyphenyl) ethane, diglycidyl ether of 9,9-bis (4-hydroxyphenyl) fluorene, glycidyl ether of the condensation product of dicyclopentadiene and phenol, triglycidyl ether of tris (hydroxyphenyl) methane, 3',4'-epoxycyclohexylmethyl 3,4-epoxycyclohexanecarboxylate, diglycidylester of hexahydrophthalic anhydride, bis (3,4-epoxycyclohexylmethyl) adipate, isomeric mixture of bis (2,3-epoxycyclopentyl) ether, isomeric mixture of bis (2,3-epoxycyclopentyl) ether reacted with ethylene glycol, isomeric mixture of bis (2,3-epoxycyclopentyl) ether blended with glycidyl ethers of bisphenol A, and mixtures thereof, said cationic photoinitiator is a diaryliodonium salt, said diaryliodonium salt has the following formula:

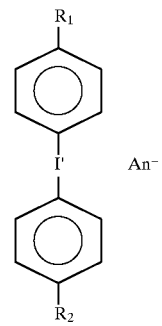

where $R_1$ and $R_2$ are selected from the group consisting of: H, methyl, ethyl, n-propyl, isopropyl, n-butyl, tert-butyl, Cl, Br, $OC_nH_{2n+1}$, $OCH_2CH(CH_3)C_nH_{2n+1}$, $OCH_2CH(C_2H_5)C_nH_{2n+1}$, $OCH_2CH(OH)C_nH_{2n+1}$, $OCH_2CO_2C_nH_{2n+1}$, $OCH(CH_3)CO_2C_nH_{2n+1}$, $OCH(C_2H_5)CO_2C_nH_{2n+1}$, and mixtures thereof, where n is an integer between 0 and 18 and $An^-$ is an anion selected from the group consisting of: hexafluoroarsenate ($AsF_6^-$), hexafluoroantimonate ($SbF_6^-$), hexafluorophosphate ($PF_6^-$), boron tetrafluoride ($BF_4^-$), trifluoromethane sulfonate ($CF_3SO_3^-$), and tetrakis (pentafluorophenylborate) ($B[C_6F_5]_4^-$), and mixtures thereof.

6. The method according to claim 1, wherein said cationic photoinitiator is said diaryliodonium salt having formula

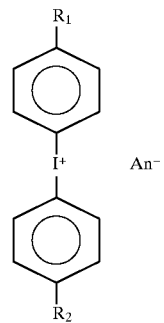

wherein $An^-$ is tetrakis(pentafluorophenyl) borate $B(C_6F_5)_4^-$).

7. The method according to claim 1, wherein said epoxy resin is 3',4'-epoxycyclohexylmethyl-3,4-epoxycyclohexanecarboxylate and said cationic photoinitiator is one or more diaryliodonium salts having the following formula:

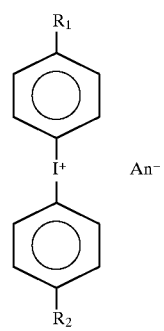

wherein $R_1$ and $R_2$ are independently selected from the group consisting of H, methyl, ethyl, n-propyl, isopropyl, n-butyl, tert-butyl, Cl, Br, $OC_nH_{2n+1}$, $OCH_2CH(CH_3)$ $C_nH_{2n+1}$, $OCH_2CH(C_2H_5)C_nH_{2n+1}$, $OCH_2CH(OH)C_nH_{2n+1}$, $OCH_2CO_2C_nH_{2n-1}$, $OCH(CH_3)CO_2C_nH_{2n+1}$, $OCH(C_2H_5)CO_2C_nH_{2n+1}$, wherein n is an integer between 0 and 18; and $An^-$ is tetrakis(pentafluorophenyl) borate) $(B(C_6F_5)_4^-)$.

8. The method according to claim 1, wherein said epoxy resin is a glycidyl ether of bisphenol A having formula:

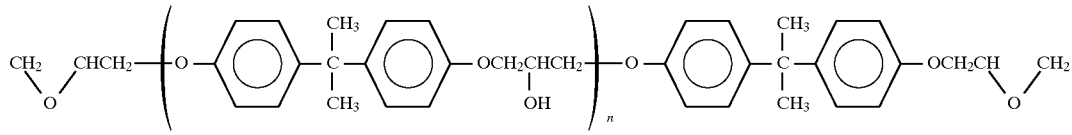

wherein n ranges from 0 to 12; and said cationic photoinitiator is one or more diaryliodonium salts having the following formula:

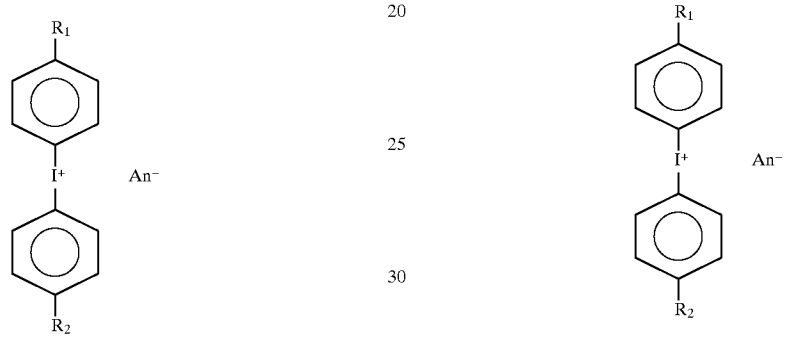

wherein $R_1$ and $R_2$ are independently selected from the group consisting of H, methyl, ethyl, n-propyl, isopropyl, n-butyl, tert-butyl, Cl, Br, $OC_nH_{2n+1}$, $OCH_2CH(CH_3)$ $C_nH_{2n+1}$, $OCH_2CH(C_2H_5)C_nH_{2n+1}$, $OCH_2CH(OH)C_nH_{2n+1}$, $OCH_2CO_2C_nH_{2n+1}$, $OCH(CH_3)CO_2C_nH_{2n+1}$, $OCH(C_2H_5)CO_2C_nH_{2n+1}$, wherein n is an integer between 0 and 18; and $An^-$ is tetrakis(pentafluorophenylborate) $(B(C_6F_5)_4^-)$.

9. The method according to claim 1, wherein said epoxy resin is an epoxy phenolic novolac or epoxy cresol novolac having formula:

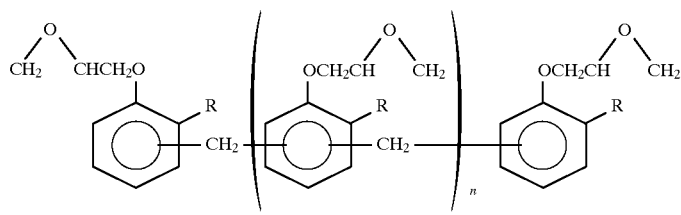

wherein n ranges from 0 to 5, and R is H or $CH_3$; and said cationic photoinitiator is one or more diaryliodonium salts having the following formula:

and $An^-$ is tetrakis(pentafluorophenyl) borate $(B(C_6F_5)_4^-)$.

10. The method according to claim 1, wherein said epoxy resin is bis(3,4-epoxycyclohexylmethyl)adipate and said cationic photoinitiator is one or more diaryliodonium salts having the following formula:

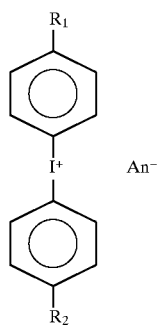

and An⁻ is tetrakis(pentafluorophenyl) borate $(B(C_6F_5)_4^-)$.

11. The method according to claim 1, wherein said epoxy resin comprises one or more resins selected from the group consisting of an isomeric mixture of bis(2,3-epoxycyclopentyl)ether, an isomeric mixture of bis(2,3-epoxycyclopentyl) ether reacted with ethylene glycol, and an isomeric mixture of bis(2,3-epoxycyclopentyl)ether blended with a bisphenol A based glycidyl ether and said cationic photoinitiator is one or more diaryliodonium salts having the following formula:

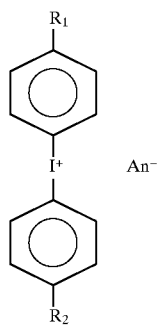

and An⁻ is tetrakis(pentafluorophenyl) borate $(B(C_6F_5)_4^-)$.

12. A method in accordance with claim 1 wherein said epoxy resin consists essentially of triglycidly ether of tris (4-hydroxyphenyl)methane-based epoxy, said cationic photoinitiator consists essentially of about 3 parts of (4-octyloxyphenyl)phenyliodonium hexafluoroantimonate per hundred parts of said epoxy resin, and said glass transition temperature being about 362° C. tan delta.

13. A method in accordance with claim 1 wherein said epoxy resin consists essentially of a fifty-fifty blend of bis(2,3-epoxycyclopentyl) ether and diglycidyl ether of bisphenol A, said cationic photoinitiator consists essentially of about 1 part to about 5 parts of (4-octyloxyphenyl) phenyliodonium hexafluoroantimonate per 100 parts of said epoxy resin, and said glass transition temperature being from about 147° C. to about 205° C. tan delta.

14. The method according to claim 1, wherein said non-thermally cured epoxy resin system has a glass transition temperature (tan δ) of about 105° C. or higher.

15. A non-thermal curing method characterized as not using external heat for curing an epoxy resin system comprising the following steps:

Step 1. providing a blend of an epoxy resin system, said epoxy resin system consisting essentially of an epoxy resin and a cationic photoinitiator, said epoxy resin being a diglycidyl ether of bisphenol A and said cationic photoinitiator being from about 0.5 to about 4 parts of (4-octyloxyphenyl)phenyliodonium hexafluoroantimonate per hundred parts of said epoxy resin, and Step 2. irradiating said blend with high energy electron beam radiation for a period of time sufficient to effectuate an efficient cross-linking and an essentially complete and uniform non-thermal curing of said epoxy resin system thereby forming a non-thermally cured epoxy resin system having a glass transition temperature from about 124° C. to about 207° C. tan delta.

16. The method according to claim 14, wherein said glass transition temperature (tan δ) is about 128° C. or higher.

17. The method according to claim 16, wherein said glass transition temperature (tan δ) is about 147° C. or higher.

18. The method according to claim 17, wherein said glass transition temperature (tan δ) is about 166° C. or higher.

19. The method according to claim 18, wherein said glass transition temperature (tan δ) is about 186° C. or higher.

20. The method according to claim 19, wherein said glass transition temperature (tan δ) is about 206° C. or higher.

21. A epoxy resin system consisting essentially of an epoxy resin and a cationic photoinitiator, said epoxy resin consists essentially of a fifty-fifty blend of bis(2,3-epoxycyclopentyl) ether and diglycidyl ether of bisphenol A and said cationic photoinitiator consists essentially of from about 1 part to about 5 parts of (4-octyloxyphenyl) phenyliodonium hexafluoroantimonate per 100 parts of said epoxy resin; said epoxy system being characterized as producing a non-thermally cured epoxy resin system having a glass transition temperature from about 147° C. to about 205° C. tan delta when exposed to high energy ionizing radiation generated by an electron beam accelerator having an energy of 10 MeV and a power of 1 kW.

22. A epoxy resin system where in the epoxy resin consists essentially of diglycidyl ether of bisphenol A and the cationic photoinitiator consists essentially of from about 0.5 to about 4 parts of (4-octyloxyphenyl)phenyliodonium hexafluoroantimonate per 100 parts of said epoxy resin; said epoxy system being characterized as producing a non-thermally cured epoxy resin system having a glass transition temperature from about 124° C. to about 207° C. tan delta when exposed to high energy ionizing radiation generated by an electron beam accelerator having an energy of 10 MeV and a power of 1 kW.

23. A epoxy resin system wherein the epoxy resin consists essentially of a epoxy phenolic novalac and the cationic photoinitiator consists essentially of about one part to about 5 parts of (4-octyloxyphenyl)phenyliodonium hexafluoroantimonate per 100 parts of said epoxy resin; said epoxy system being characterized as producing a non-thermally cured epoxy resin system having a glass transition temperature from about 128° C. to about 197° C. Tan delta when exposed to high energy ionizing radiation generated by an electron beam accelerator having an energy of 10 MeV and a power of 1 kW.

24. A epoxy resin system wherein the epoxy resin consists essentially of a triglycidyl ether of tris(4-hydroxyphenyl) methane-based epoxy and the cationic photoinitiator consists essentially of about 3 parts of (4-Octyloxyphenyl) phenyliodonium hexafluoroantimonate per 100 parts of said epoxy resin; said epoxy system being characterized as producing a non-thermally cured epoxy resin system having a glass transition temperature being 362° C. tan delta when exposed to high energy ionizing radiation generated by an electron beam accelerator having an energy of 10 MeV and a power of 1 kW.

* * * * *